United States Patent
Tarasuk-Levin et al.

(10) Patent No.: US 10,467,049 B2
(45) Date of Patent: *Nov. 5, 2019

(54) VIRTUAL MACHINE MIGRATION WITHIN A HYBRID CLOUD SYSTEM

(71) Applicant: VMware, Inc., Palo Alto, CA (US)

(72) Inventors: Gabriel Tarasuk-Levin, Sunnyvale, CA (US); Rohan Pradip Shah, Mountain View, CA (US); Nathan L. Prziborowski, Sonoma, CA (US); Prachetaa Raghavan, Sunnyvale, CA (US); Benjamin Yun Liang, San Jose, CA (US); Haripriya Rajagopal, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/114,119

(22) Filed: Aug. 27, 2018

(65) Prior Publication Data

US 2019/0012199 A1 Jan. 10, 2019

Related U.S. Application Data

(63) Continuation of application No. 14/839,350, filed on Aug. 28, 2015, now Pat. No. 10,061,611.

(51) Int. Cl.
*G06F 9/455* (2018.01)
*G06F 9/48* (2006.01)
(Continued)

(52) U.S. Cl.
CPC ........ *G06F 9/4856* (2013.01); *G06F 9/44505* (2013.01); *G06F 9/45558* (2013.01); *H04L 63/0209* (2013.01); *G06F 2009/4557* (2013.01)

(58) Field of Classification Search
CPC .............. G06F 9/4856; G06F 9/44505; G06F 9/45558; G06F 2009/4557; G06F 2009/45562
See application file for complete search history.

(56) References Cited

U.S. PATENT DOCUMENTS 6,457,109 B1 9/2002 Milillo
8,219,653 B1 7/2012 Keagy
(Continued)

FOREIGN PATENT DOCUMENTS

EP 2648098 A2 10/2013

OTHER PUBLICATIONS

Singh et al., Security on the Mainframe, Redbooks, Mar. 29, 2010, 82-83, 87.
(Continued)

*Primary Examiner* — Emerson C Puente
*Assistant Examiner* — Zhi Chen
(74) *Attorney, Agent, or Firm* — Loza & Loza, LLP

(57) ABSTRACT

An example method of migrating a virtualized computing instance between source and destination virtualized computing systems includes executing a first migration workflow in the source virtualized computing system, where a host computer executing the virtualized computing instance is a source host in the first migration workflow and a first mobility agent simulates a destination host in the first migration workflow. The method further includes executing a second migration workflow in the destination virtualized computing system, where a second mobility agent in the destination virtualized computing system simulates a source host in the second migration workflow and a host computer in the destination virtualized computing system is a destination host in the second migration workflow. The method further includes transferring, during execution of the first
(Continued)

and second migration workflows, migration data including the virtualized computing instance between the first mobility agent and the second mobility agent over a network.

19 Claims, 5 Drawing Sheets

(51) Int. Cl.
*G06F 9/445* (2018.01)
*H04L 29/06* (2006.01)

(56) References Cited

U.S. PATENT DOCUMENTS

| | | | |
|---|---|---|---|
| 8,281,363 B1 | 10/2012 | Hernacki | |
| 8,484,653 B2 | 7/2013 | Tsirkin | |
| 8,639,660 B1 | 1/2014 | Ou | |
| 8,656,018 B1 | 2/2014 | Keagy et al. | |
| 9,164,795 B1 | 10/2015 | Vincent | |
| 2002/0103882 A1 | 8/2002 | Johnston et al. | |
| 2004/0015946 A1 | 1/2004 | Te'eni et al. | |
| 2006/0239287 A1 | 10/2006 | Johnsen et al. | |
| 2007/0079126 A1 | 4/2007 | Hsu et al. | |
| 2007/0159974 A1 | 7/2007 | Fabbri et al. | |
| 2007/0168987 A1 | 7/2007 | Vetillard et al. | |
| 2008/0126730 A1* | 5/2008 | Miyamae | G06F 3/0613 711/165 |
| 2010/0031056 A1* | 2/2010 | Harada | G06F 21/602 713/193 |
| 2010/0287548 A1 | 11/2010 | Zhou et al. | |
| 2010/0322255 A1 | 12/2010 | Hao et al. | |
| 2012/0284709 A1 | 11/2012 | Lorenc et al. | |
| 2012/0303799 A1 | 11/2012 | Nadas et al. | |
| 2012/0311568 A1 | 12/2012 | Jansen | |
| 2013/0124841 A1 | 5/2013 | Huang et al. | |
| 2013/0201494 A1 | 8/2013 | Sweet et al. | |
| 2013/0250951 A1 | 9/2013 | Koganti | |
| 2013/0262390 A1 | 10/2013 | Kumarasamy et al. | |
| 2013/0326177 A1 | 12/2013 | Diwa | |
| 2013/0326510 A1* | 12/2013 | Adekile | G06F 11/0709 718/1 |
| 2014/0006751 A1* | 1/2014 | Aliseychik | G06F 15/76 712/30 |
| 2014/0007085 A1* | 1/2014 | Campion | G06F 9/455 718/1 |
| 2014/0149635 A1 | 5/2014 | Bacher et al. | |
| 2014/0366155 A1 | 12/2014 | Chang et al. | |
| 2015/0113526 A1 | 4/2015 | Baboval | |

OTHER PUBLICATIONS

Rouse, Logical Partition (LPAR), Mar. 2011, wahtis.com.
Sandstein, Logical Partition, Jul. 27, 2015, Wikipedia entry retrieved from https://en.wikipedia.org/w/index.php?title=Logical_partition &oldid=673360123.
International Search Report and Written Opinion of the International Searching Authority for PCT/US2016/049091, dated Nov. 11, 2016. 12 pages.

* cited by examiner

VIRTUAL MACHINE MIGRATION WITHIN A HYBRID CLOUD SYSTEM

CROSS-REFERENCE TO RELATED APPLICATION

This application claims priority from and is a continuation of U.S. patent application Ser. No. 14/839,350, filed Aug. 28, 2015 (now U.S. Pat. No. 10,061,611), which is incorporated herein by reference in its entirety.

BACKGROUND

Cloud architectures are used in cloud computing and cloud storage systems for offering infrastructure-as-a-service (IaaS) cloud services. Examples of cloud architectures include the VMware vCloud Director® cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual machines (VMs) and logical networks.

A hybrid cloud system aggregates the resource capability from both private and public clouds. A private cloud can include one or more customer datacenters (referred to herein as "on-premise datacenters"). The public cloud can include a multi-tenant cloud architecture providing IaaS cloud services. In a hybrid cloud system, it is desirable to support VM migration between the datacenter and the public cloud. Presently, to implement VM migration, a customer must first create a VM from scratch within the public cloud and then transfer data from a powered-off source VM in the on-premise datacenter to the newly created VM in the public cloud. This process has the disadvantage of significant downtime for the VM being migrated.

SUMMARY

One or more embodiments provide techniques for virtual machine (VM) migration within a hybrid cloud system. In an embodiment, a method of migrating a virtualized computing instance between source and destination virtualized computing systems includes executing a first migration workflow in the source virtualized computing system, where a host computer in the source virtualized computing system executing the virtualized computing instance is a source host in the first migration workflow and a first mobility agent in the source virtualized computing system simulates a destination host in the first migration workflow. The method further includes executing a second migration workflow in the destination virtualized computing system, where a second mobility agent in the destination virtualized computing system simulates a source host in the second migration workflow and a host computer in the destination virtualized computing system is a destination host in the second migration workflow. The method further includes transferring, during execution of the first and second migration workflows, migration data including the virtualized computing instance between the first mobility agent and the second mobility agent over a network.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
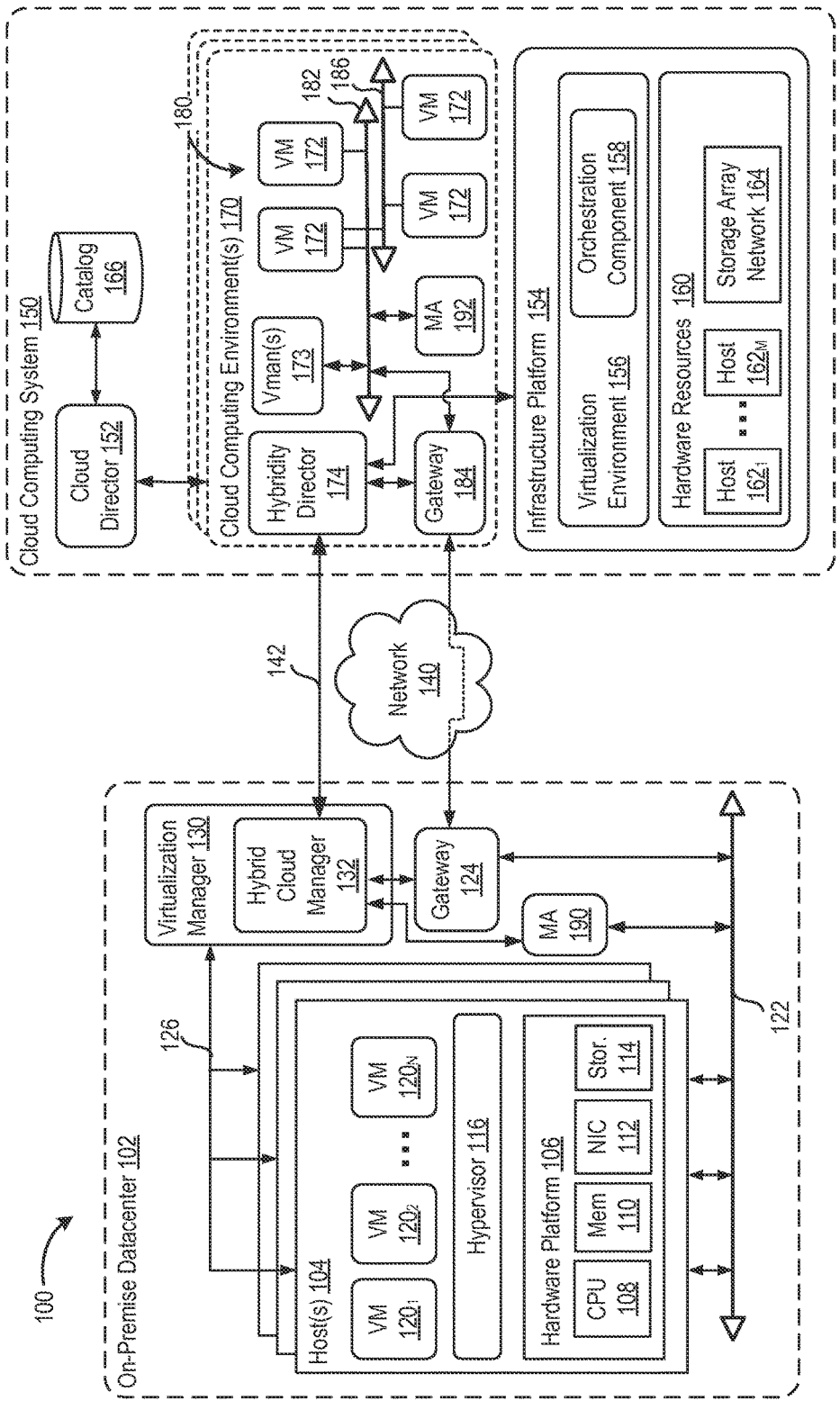
FIG. 1 is a block diagram of a hybrid cloud computing system in which one or more embodiments of the present disclosure may be utilized.

FIG. 1 is a block diagram of a hybrid cloud computing system 100 in which one or more embodiments of the present disclosure may be utilized. Hybrid cloud computing system 100 includes a virtualized computing system implementing an on-premise datacenter 102 and a virtualized computing system implementing a cloud computing system 150. Hybrid cloud computing system 100 is configured to provide a common platform for managing and executing virtual workloads seamlessly between on-premise datacenter 102 and cloud computing system 150. In one embodiment, on-premise datacenter 102 may be a data center controlled and administrated by a particular enterprise or business organization, while cloud computing system 150 may be operated by a cloud computing service provider and exposed as a service available to account holders, such as the particular enterprise in addition to other enterprises. As such, on-premise datacenter 102 may sometimes be referred to as a "private" cloud, and cloud computing system 150 may be referred to as a "public" cloud.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

On-premise datacenter 102 includes one or more host computer systems ("hosts 104"). Hosts 104 may be constructed on a server grade hardware platform 106, such as an x86 architecture platform. As shown, hardware platform 106 of each host 104 may include conventional components of a computing device, such as one or more processors (CPUs) 108, system memory 110, a network interface 112, storage system 114, and other I/O devices such as, for example, a mouse and keyboard (not shown). CPU 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within on-premise datacenter 102. Network interface 112 may be one or more network adapters, also referred to as a Network Interface Card (NIC). Storage system 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi™ hypervisor provided as part of the VMware vSphere® solution made commercially available from VMware, Inc. of Palo Alto, Calif. Hypervisor 116 may run on top of the operating system of host 104 or directly on hardware components of host 104.

On-premise datacenter 102 includes a virtualization management component (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in on-premise datacenter 102, or alternatively, running as a VM in one of hosts 104. One example of a virtualization manager is the vCenter Server™ product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtualized computing resources provided by cloud computing system 150 with virtualized computing resources of computing system 102 to form a unified "hybrid" computing platform. Hybrid cloud manager 132 is configured to deploy VMs in cloud computing system 150, transfer VMs from virtualized computing system 102 to cloud computing system 150, and perform other "cross-cloud" administrative tasks, as described in greater detail later. In one implementation, hybrid cloud manager 132 is a module or plug-in complement to virtualization manager 130, although other implementations may be used, such as a separate computer program executing in a central server or running in a VM in one of hosts 104. One example of hybrid cloud manager 132 is the VMware vCloud Connector® product made available from VMware, Inc.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in on-premise datacenter 102 with connectivity to an external network 140 (e.g., Internet). Gateway 124 may manage external public IP addresses for VMs 120 and route traffic incoming to and outgoing from on-premise datacenter 102 and provide networking services, such as firewalls, network address translation (NAT), dynamic host configuration protocol (DHCP), load balancing, and virtual private network (VPN) connectivity over a network 140.

In one or more embodiments, cloud computing system 150 is configured to dynamically provide an enterprise (or users of an enterprise) with one or more virtual data centers 170 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

Each cloud computing environment 170 is associated with a particular tenant of cloud computing system 150, such as the enterprise providing virtualized computing system 102. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtualized computing resources on a shared physical infrastructure. As shown in FIG. 1, cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to on-premise datacenter 102, virtualization environment 156 may be implemented by running on hosts 162 VMware ESXi™-based hypervisor technologies provided by VMware, Inc. (although it should be recognized that any other virtualization technologies, including Xen® and Microsoft Hyper-V® virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp technology made available by VMware, Inc., although other technologies may be utilized. Cloud director 152 receives provisioning requests submitted (e.g., via REST API calls) and may propagates such requests to orchestration component 158 to instantiate the requested virtual machines (e.g., VMs 172). One example of cloud director 152 is the VMware vCloud Director® produced by VMware, Inc.

In the embodiment of FIG. 1, cloud computing environment 170 supports the creation of a virtual data center 180 having a plurality of virtual machines 172 instantiated to, for example, host deployed multi-tier applications, as well as one or more virtualization managers 173 (abbreviated as "Vman(s)"). A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160. Virtualization managers 173 can be configured similarly to virtualization manager 130.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway 124 within on-premise datacenter 102. In other embodiments, gateway 184 may be configured to connect to communicate with on-premise datacenter 102 using a high-throughput, dedicated link (depicted as a direct connect 142) between on-premise datacenter 102 and cloud computing system 150. In one or more embodiments, gateways 124 and 184 are configured to provide a "stretched" layer-2 (L2) network that spans on-premise datacenter 102 and virtual data center 180, as shown in FIG. 1.

While FIG. 1 depicts a single connection between on-premise gateway 124 and cloud-side gateway 184 for illustration purposes, it should be recognized that multiple connections between multiple on-premise gateways 124 and cloud-side gateways 184 may be used. Furthermore, while FIG. 1 depicts a single instance of a gateway 184, it is recognized that gateway 184 may represent multiple gateway components within cloud computing system 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud computing system 150 may be used to manage all public-facing traffic incoming and outgoing from cloud computing system 150.

In one embodiment, each virtual data center 180 includes a "hybridity" director module (depicted as hybridity director 174) configured to communicate with the corresponding hybrid cloud manager 132 in on-premise datacenter 102 to enable a common virtualized computing platform between on-premise datacenter 102 and cloud computing system 150. Hybridity director 174 (e.g., executing as a virtual appliance) may communicate with hybrid cloud manager 132 using Internet-based traffic via a VPN tunnel established between gateways 124 and 184, or alternatively, using direct connection 142. In one embodiment, hybridity director 174 may control gateway 184 to control network traffic into virtual data center 180. In some embodiments, hybridity director 174 may control VMs 172 and hosts 162 of cloud computing system 150 via infrastructure platform 154.

In an embodiment, hybrid cloud system 100 is configured for cross-system VM migration between virtualized computing systems, such as cross-cloud VM migration between on-premise datacenter 102 and cloud computing system 150. In one example, on-premise datacenter 102 is the migration source and cloud computing system 150 is the migration destination. Alternatively, cloud computing system 150 can be the migration source and on-premise datacenter 102 can be the migration destination. For purposes of clarity by example, embodiments of cross-cloud VM migration are described below with respect to the on-premise datacenter 102 being the migration source and the cloud computing system 150 being the migration destination. It is to be understood that the migration can be reversed using the same techniques.

Cross-cloud VM migration described herein enables users to seamlessly move VMs between their on-premise datacenters and the public cloud. Cross-cloud VM migration includes both "cold migration" in which the VM is powered off during migration, as well as "hot migration" in which the VM is powered on during migration. To facilitate cross-cloud VM migration, on-premise datacenter 102 is configured with a mobility agent 190 and cloud computing system 150 is configured with a mobility agent 192. Mobility agent 190 is used as a destination of an on-premise VM migration. From the perspective of the on-premise datacenter 102, a target VM is migrated locally to mobility agent 190. Mobility agent 192 is used as a source of a cloud VM migration. From the perspective of cloud computing system 150, mobility agent 192 is a source VM to be migrated locally to a target host. Mobility agent 190 forwards VM migration traffic to mobility agent 192 over a secure channel between gateway 124 and gateway 184.

Mobility agent 190 can be implemented using a VM in on-premise datacenter 102 (e.g., a VM 120) or implemented directly on a hardware computer system. Likewise, mobility agent 192 can be implemented using a VM in cloud computing system 150 (e.g., a VM 172) or implemented directly on a hardware computer system. Each mobility agent 190, 192 includes a host simulator executing within an OS. That is, mobility agent 190 can simulate a host 104 in on-premise data center 102, and mobility agent 192 can simulate a host 162 in cloud computing system 150. A host simulator can simulate a host computer in terms of receiving and transmitting the appropriate messages to a virtualization manager that make it appear as an actual host computer eligible for hosting VMs. Mobility agent 190 can be registered with virtualization manager 130 as an eligible host for VM migration within on-premise datacenter 102. Mobility agent 192 can be registered with virtualization manager 173 as an eligible host for VM migration within cloud computing system 150. Each mobility agent 190 and 192 functions as a proxy for VM migration traffic. Mobility agent 190 can function as a proxy for inbound VM migration traffic within on-premise datacenter 102. Mobility agent 190 can forward the VM migration traffic to mobility agent 192 through a secure channel established between gateways 124 and 184. Mobility agent 192 functions as a proxy for outbound VM migration traffic within cloud computing system 150. Mobility agent 192 forwards the VM migration traffic to a destination host 162 within cloud computing system 150.

Within the cross-cloud VM migration workflow, the virtualization manager 130 executes a local migration workflow between a source host and mobility agent 190, and a virtualization manager 173 executes a local migration workflow between mobility agent 192 and a destination host. Each mobility agent 190 and 192 performs blocking and synchronization between the concurrent local migration workflows. When a cross-cloud VM migration is started, mobility agent 190 blocks the local VM migration workflow at the point where mobility agent 190 is prepared to receive data from the source host. Likewise, mobility agent 192 blocks the local VM migration workflow at the point where mobility agent 192 is prepared to send data to the destination host. Once both mobility agents 190 and 192 are synchronized, mobility agents 190 and 192 will unblock and proceed with the forwarding process.

Use of mobility agents 190 and 192 obviates the need to modify the virtualization managers. The virtualization managers can perform the standard local VM migration workflow, with the underlying logic for cross-cloud VM migration handled by mobility agents 190 and 192. VM migration directly between a host in on-premise datacenter 102 and a host in cloud computing system 150 would require implementation of VM migration independent of the virtualization managers and re-implementation at the host-level of many functions performed by the virtualization managers.

A cross-cloud VM migration can be initiated by hybrid cloud manager 132. When a cross-cloud VM migration is initiated, hybrid cloud manager 132 can communicate with hybridity director 174 to create a shadow VM on mobility agent 192. The shadow VM includes the same or substantially similar configuration as the source VM being migrated so that the mobility agent 192 can mimic the source VM within the local VM migration workflow executing in the cloud computing system 150.

Hybrid cloud manager 132 can also create secure channels between gateways 124 and 184 on-demand in order to route traffic associated with the cross-cloud VM migration. The secure channels can be wide area network (WAN) optimized and all traffic propagating therein can be encrypted. One feature of local VM migration dictates that the migrated VM can retain its same network configuration post-migration. To manage this feature in cross-cloud VM migration, hybrid cloud manager 132 can configure the secure channels to implement a stretched layer-2 network, which allows the VM being migrated to retain its networking configuration.

Figure 2:
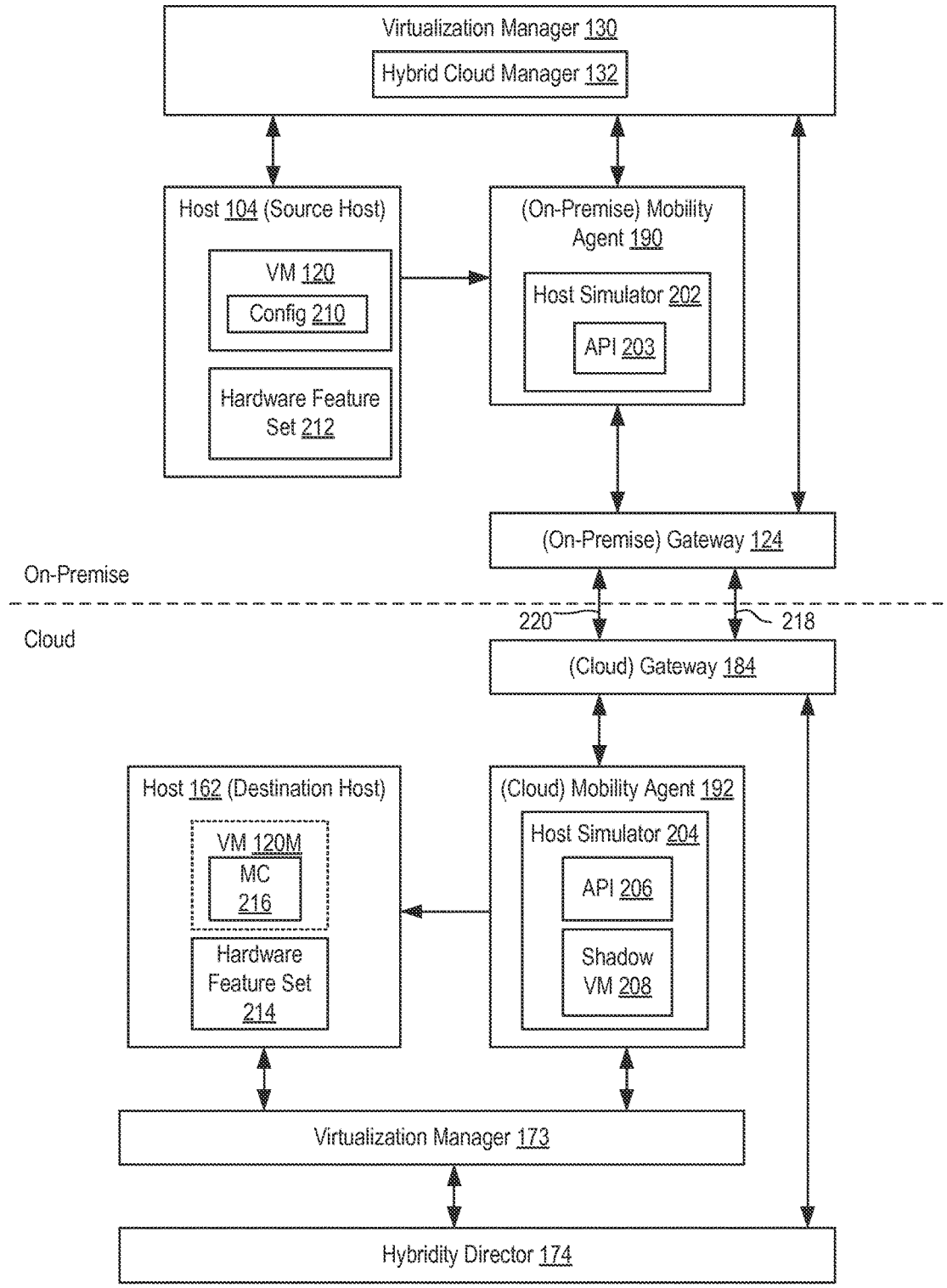
FIG. 2 is a block diagram showing logical connections and dataflow among various components in hybrid cloud with respect to a cross-cloud VM migration according to an embodiment.
Figure 3:
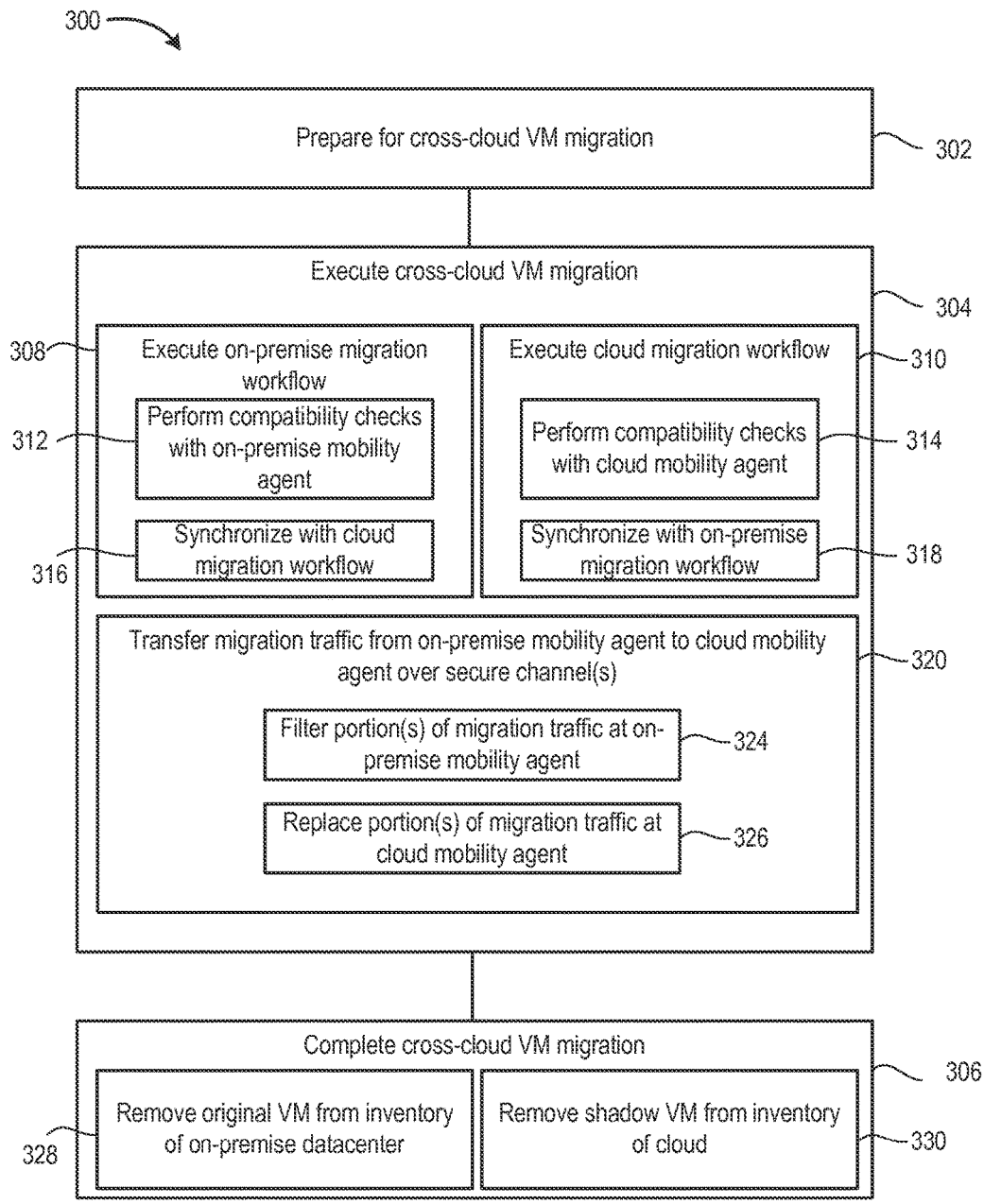
FIG. 3 is a flow diagram depicting an embodiment of a method of migrating a virtualized computing instance, such as a VM, between source and destination virtualized computing systems, such as between on-premise datacenter and cloud computing system.
Figure 4:
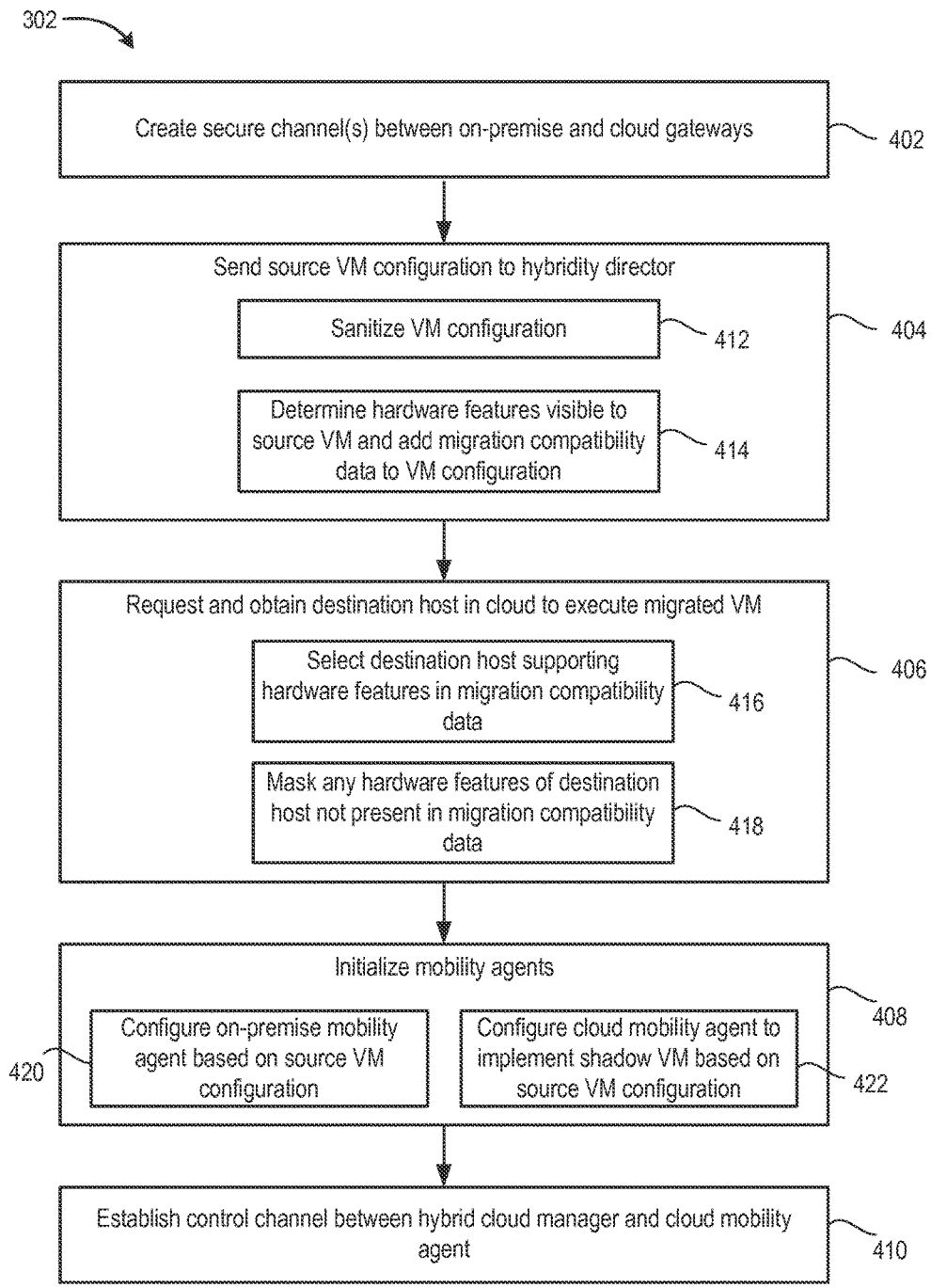
FIG. 4 is a flow diagram depicting a method of preparing cross-cloud VM migration according to an embodiment.

FIG. 2 is a block diagram showing logical connections and dataflow among various components in hybrid cloud 100 with respect to a cross-cloud VM migration according to an embodiment. Elements in FIG. 2 that are the same or similar to those of FIG. 1 are designated with identical reference numerals. FIG. 3 is a flow diagram depicting an embodiment of a method 300 of migrating a virtualized computing instance, such as a VM, between source and destination virtualized computing systems, such as between on-premise datacenter 102 and cloud computing system 150. FIG. 4 is a flow diagram depicting a method 302 of preparing cross-cloud VM migration according to an embodiment. Aspects of methods 300 and 302 can be understood with respect to FIG. 2.

Referring to FIG. 3, method 300 includes the following high-level steps performed within hybrid cloud system 100: At method 302, hybrid cloud system 100 prepares for cross-cloud VM migration. As shown in FIG. 2, a VM 120 executing on a host 104 (the "source host") in on-premise datacenter 102 is to be migrated to cloud computing system 150. VM 120 and host 104 are managed by virtualization manager 130. VM 120 includes a configuration 210 (also referred to as a VM configuration). A VM configuration includes various information and settings for VM 120, such as the number of allocated virtual CPUs, the amount of allocated virtual memory, the amount of allocated virtual storage, datastore location(s), network information, virtual hardware information, and the like. Host 104 includes a hardware feature set 212. Hardware feature set 212 includes the various hardware features of host 104, such as CPU features, chipset features, memory features, storage features, and the like. VM 120 can be configured to operate in a migration compatibility (MC) mode. In MC mode, an administrator establishes MC data specifying a limited hardware feature set for VM 120. Virtualization software on host 104 (e.g., hypervisor 116) will mask any features in hardware feature set 212 that are not specified by the established MC data. Enforcement of MC mode for VM 120 after migration to cloud computing system 150 is described below.

Referring to FIG. 3, at step 304, hybrid cloud system 100 executes cross-cloud VM migration to migrate VM 120 from on-premise datacenter 102 to cloud computing system 150. At step 306, hybrid cloud system 100 completes cross-cloud VM migration. Each of steps 302, 304, and 306 can be performed by one or more components within hybrid cloud system 100. Thus, the hardware and software for performing method 300 is distributed across on-premise datacenter 102 and cloud computing system 150. Example components and functions pertaining method 300 are described below.

FIG. 4 shows an example of method 302 for preparing for cross-cloud VM migration. At step 402, when a cross-cloud VM migration is triggered (e.g., by an administrator), hybrid cloud manager 132 creates one or more secure channels 220 (FIG. 2) between on-premise gateway 124 and cloud gateway 184. Each secure channel can be encrypted and WAN-optimized. At step 404, hybrid cloud manager 132 retrieves VM configuration 210 from virtualization manager 130 and sends VM configuration 210 to hybridity director 174 over a secure channel.

At step 406, hybridity director 174 requests and obtains a destination host (e.g., a host 162) in cloud computing system 150 to execute the migrated VM. In an embodiment, hybridity director 174 can communicate with cloud director 152 to request placement of the VM being migrated. In response, cloud director 152 can return a destination virtualization manager (e.g., a virtualization manager 173). Hybridity director 174 can then cooperate with virtualization manager 173 to select a destination host (e.g., a host 162) for the migrated VM.

At step 408, hybridity director 174 can initialize cloud mobility agent 192, and hybrid cloud manager 132 can initialize on-premise mobility agent 190. At step 410, hybrid cloud manager 132 can establish a control channel 218 with cloud mobility agent 192 through on-premise gateway 124 and cloud gateway 184. The control channel can be used to exchange status information and maintain synchronization between mobility agents, as described below.

In an embodiment, step 404 includes sub-steps 412 and 414. At step 412, hybrid cloud manager 132 can sanitize VM configuration 210 before sending VM configuration 210 to hybridity director 174. Hybrid cloud manager 132 can remove data related to VM state and/or on-premise datacenter state for purposes of security. Such removed data can include, for example, datastore universal unique identifiers (UUIDs), storage paths, network paths, and the like. At step 414, hybrid cloud manager 132 can determine hardware features visible to VM 120 and add MC data to VM configuration 210. As discussed above, VM 120 can be configured in an MC mode that specifies a limited set of hardware features to be supported. Hybrid cloud manager 132 can detect the limited set of hardware features specified by the MC mode and add MC data to VM configuration 210. Hybrid cloud manager 132 can obtain MC data from host 104, from virtualization manager 130, or both.

In an embodiment, step 406 includes sub-steps 416 and 418. At step 416, hybridity director 174 selects a destination host supporting hardware features specified in MC data of VM configuration 210. Hosts 162 in cloud computing system 150 that do not support the limited set of hardware features specified are removed from consideration. At step 418, hybridity director 174 cooperates with virtualization software on a selected host 162 and/or with virtualization manager 173 to mask any hardware features of the destination host that are not present in the MC data of VM configuration 210. Notably, the destination host can include more hardware features than the source host. If the VM is migrated to a destination host having more hardware features, the VM can adopt the additional features. This can operate to prevent the VM from being migrated back to the original source host, which does not have these additional hardware features. An administrator can configure VM 120 in an MC mode so that VM can be readily migrated back to the original source host. Hybrid cloud manager 132 can add MC data to VM configuration 210 sent to hybridity director 174, and hybridity director 174 can direct virtualization manager 173 and/or the destination host to mask any features not present in the specified limited set of hardware features.

In an embodiment, step 408 includes sub-steps 420 and 422. At step 420, hybrid cloud manager 132 configures on-premise mobility agent 190 based on VM configuration 210. That is, on-premise mobility agent 190 is configured to simulate a host having the same or substantially similar features as the source host.

As shown in FIG. 2, on-premise mobility agent 190 can include a host simulator 202. Host simulator 202 simulates a host and is configurable through an application programming interface (API) 203. Hybrid cloud manager 132 can configure host simulator 202 through API 203 and add the simulated host to the inventory of virtualization manager 130. To virtualization manager 130, the simulated host appears as any other host within on-premise datacenter. This allows host simulator 202 to act as a destination during the on-premise migration workflow.

At step 422, hybridity director 174 configures cloud mobility agent 192 to implement a shadow VM based on VM configuration 210. As shown in FIG. 2, cloud mobility agent 192 can include a host simulator 204. Host simulator 204 simulates a host and is configurable through an API 206. Hybridity director 174 can configure host simulator 204 through API 206 and add the simulated host to the inventory of virtualization manager 173. To virtualization manager 173, the simulated host appears as any other host within cloud computing system 150. In addition, hybridity director 174 provides a shadow VM 208 to host simulator 204 (e.g., through API 206). Shadow VM 208 includes a configuration the same as or substantially the same as VM configuration 210. Hybridity director 174 can add shadow VM 208 to the inventory managed by virtualization manager 173. This allows shadow VM 208 to act as a source during the cloud migration workflow. Note that shadow VM 208 is not an actual virtual machine. Rather, shadow VM 208 comprises software that mimics an actual VM.

Returning to FIG. 3, the cross-cloud VM migration is executed during step 304. In an embodiment, step 304 includes various sub-steps. At step 308, hybrid cloud manager 132 directs virtualization manager 130 to execute an on-premise migration workflow. For the on-premise migration workflow, the VM being migrated is VM 120, the source host is host 104, and the destination host is a host simulated by host simulator 202 in on-premise mobility agent 190. The on-premise migration workflow itself can include preparation, execution, and completion steps similar to the cross-cloud VM workflow. In an embodiment, during preparation, the on-premise migration workflow can include various compatibility checks (step 312). Virtualization manager 130 executes the compatibility checks to ensure that VM 120 can be migrated to the specified destination host. As discussed above, hybrid cloud manager 132 configures host simulator 202 to simulate a host capable of executing VM 120 based on VM configuration 210. This allows the compatibility checks performed by virtualization manager 130 to be satisfied.

At step 310, hybridity director 174 directs virtualization manager 173 to execute a cloud migration workflow. For the cloud migration workflow, the VM being migrated is shadow VM 208, the source host is a host simulated by host simulator 204 in cloud mobility agent 192, and the destination host is a host 162. The cloud migration workflow, similar to the on-premise migration workflow, includes preparation, execution, and completion steps. In an embodiment, during preparation, the cloud migration workflow can include various compatibility checks (step 314). Virtualization manger 173 executes the compatibility checks to ensure that shadow VM 208 can be migrated to the specified destination host. As discussed above, hybridity director 174 configures host simulator 204 with shadow VM 208 that includes the same or substantially the same configuration as VM 120. This allows the compatibility checks performed by virtualization manager 130 to be satisfied.

The on-premise and cloud migration workflows are executed concurrently. During execution of the two concurrent workflows, some steps of one workflow can depend on performance of other steps in the other workflow. For example, the on-premise migration workflow can proceed up until the point at which on-premise mobility agent 190 is ready to receive migration data from the source host. Mobility agent 190 can block the on-premise migration workflow at that point until receiving confirmation that mobility agent 192 is ready to receive the migration data. In another example, the cloud migration workflow can proceed up until the point at which the cloud mobility agent 192 is ready to receive migration data over the network. Mobility agent 192 can block the cloud migration workflow at the point until receiving conformation that mobility agent 190 is ready to send the migration data. These are example blocking points and the respective workflows can include other blocking points. The on-premise migration workflow and the cloud migration workflow can perform steps 316 and 318, respectively, in order to synchronize the on-premise migration workflow with the cloud migration workflow.

At step 320, on-premise mobility agent 190 transfers migration traffic to cloud mobility agent 192 over one or more secure channel(s) established between gateways 124 and 184. Step 320 can include sub-steps 324 and 326. At step 324, on-premise mobility agent 190 can filter one or more portions of the migration traffic from being sent to cloud mobility agent 192. For example, on-premise mobility agent 190 can filter various identifiers that pertain only to on-premise datacenter 102. On-premise mobility agent 190 can insert dummy data in place of the filtered portions (e.g., dummy IDs). At step 326, cloud mobility agent 192 can replace one or more portions of the migration traffic. For example, cloud mobility agent 192 can insert identifiers that pertain to cloud computing system 150 in place of dummy identifiers inserted by on-premise mobility agent 190 in step 324.

Step 306 can include sub-steps 328 and 330. At step 328, after migration is complete, virtualization manager 130 can remove VM 120 from its inventory. At step 330, virtualization manager 173 can remove shadow VM 208 from its inventory. After migration is complete, host 162 can execute a VM 120M, which is a migration of VM 120.

It is to be understood that at least a portion of the various steps and sub-steps shown in FIGS. 3 and 4 can be executed concurrently. That is, while some steps/sub-steps can be executed sequentially, other steps/sub-steps can be executed concurrently. The arrangement of steps/sub-steps in FIGS. 3 and 4 is not meant to convey any particular sequential/concurrent arrangement other than as required by the functional description above.

The cross-cloud VM migration workflow described with respect to FIGS. 2-4 can be used to migrate a VM from one virtualized computing system to another. In the example above, a VM is migrated from on-premise datacenter 102 to cloud computing system 150. However, in other examples, a VM can be migrated from cloud computing system 150 to on-premise datacenter 102 using a similar process. Further, the cross-cloud VM migration workflow described herein encompasses both hot and cold migrations.

Figure 5:
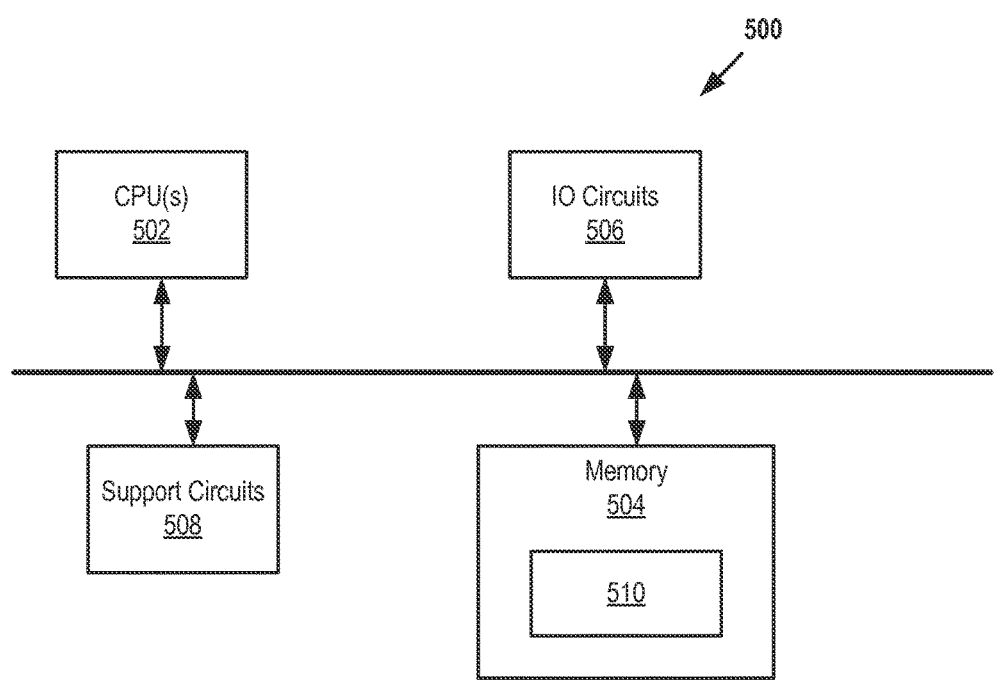
FIG. 5 is a block diagram depicting an example of a computer system in which one or more embodiments of the present disclosure may be utilized.

FIG. 5 is a block diagram depicting an example of a computer system 500 in which one or more embodiments of the present disclosure may be utilized. Computer system 500 can be used as a host to implement hybrid cloud manager 132, hybridity director 174, or other component described above. Computer system 500 includes one or more central processing units (CPUs) 502, memory 504, input/output (IO) circuits 506, and various support circuits 508. Each of CPUs 502 can include any microprocessor known in the art and can execute instructions stored on computer readable storage, such as memory 504. Memory 504 can include various volatile and/or non-volatile memory devices, such as random access memory (RAM), read only memory (ROM), and the like. Instructions and data 510 for performing the various methods and techniques described above can be stored in memory 504 for execution by CPUs 502. That is, memory 504 can store instructions executable by CPUs 502 to perform one or more steps/sub-steps described above in FIGS. 3 and 4. Support circuits 508 include various circuits used to support operation of a computer system as known in the art.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers". OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of migrating a virtualized computing instance between host computers in source and destination virtualized computing systems, comprising:

determining a set of hardware features for the virtualized computing instance running in a source host computer at the source virtualized computing system to generate migration compatibility data;

selecting a destination host computer at the destination virtualized computing system supporting the set of hardware features in the migration compatibility data; and masking any of one or more hardware features of the destination host computer that is not present in the migration compatibility data from being visible to the virtualized computing instance, the set of hardware features including at least a CPU feature, a memory feature and a storage feature, wherein the masking is performed to prevent the virtualized computing instance running in the destination host computer at the destination virtualized computing system to adopt the masked hardware features so that the virtualized computing instance is compatible for migration back to the source host computer at the source virtualized computing system.

2. The method of claim 1, further comprising:

adding the migration compatibility data to a configuration of the virtualized computing instance; and sending the configuration of the virtualized computing instance from the source virtualized computing system to the destination virtualized computing system;

wherein the destination host computer includes a set of hardware features matching the set of hardware features in the migration compatibility data.

3. The method of claim 1, further comprising:

executing a first migration workflow for performing a first local transfer within the source virtualized computing system, the first local transfer being from a source host computer to a first mobility agent that operates as a simulated destination host computer;

executing a second migration workflow for performing a second local transfer within the destination virtualized computing system, the second local transfer being from a second mobility agent that operates as a simulated source host computer to the destination host computer; and transferring, during execution of the first and second migration workflows, the virtualized computing instance between the first mobility agent and the second mobility agent over a network.

4. The method of claim 3, further comprising:
creating a secure channel through the network between a first gateway in the source virtualized computing system and a second gateway in the destination virtualized computing system; and
sending a configuration of the virtualized computing instance from the source virtualized computing system to the destination virtualized computing system over the secure channel.

5. The method of claim 4, further comprising:
removing data from the configuration prior to sending the configuration to the destination virtualized computing system.

6. The method of claim 3, further comprising:
creating a shadow virtualized computing instance on the second mobility agent having a substantially same configuration as the virtualized computing instance.

7. The method of claim 3, further comprising:
synchronizing the first migration workflow and the second migration workflow.

8. The method of claim 3, further comprising:
receiving a configuration of the virtualized computing instance;
configuring each of the first mobility agent and the second mobility agent using an application programming interface (API) based on the configuration of the virtualized computing instance; and
performing, during the first and second migration workflows, compatibility checks on the simulated destination host computer and the simulated source host computer.

9. A computer system, comprising:
memory configured to store code; and
one or more processors configured to execute the code to
migrate a virtualized computing instance between host computers in source and destination virtualized computing system:
determine a set of hardware features for the virtualized computing instance running in a source host computer at the source virtualized computing system to generate migration compatibility data;
select a destination host computer at the destination virtualized computing system supporting the set of hardware features in the migration compatibility data; and
mask any of one or more hardware features of the destination host computer that is not present in the migration compatibility data from being visible to the virtualized computing instance, the set of hardware features including at least a CPU feature, a memory feature and a storage feature, wherein the masking is performed to prevent the virtualized computing instance running in the destination host computer at the destination virtualized computing system to adopt the masked hardware features so that the virtualized computing instance is compatible for migration back to the source host computer at the source virtualized computing system.

10. The computer system of claim 9, wherein the one or more processors are configured to execute the code to:
add the migration compatibility data to a configuration of the virtualized computing instance; and
send the configuration of the virtualized computing instance from the source virtualized computing system to the destination virtualized computing system;
wherein the destination host computer includes a set of hardware features matching the set of hardware features in the migration compatibility data.

11. The computer system of claim 9, wherein the one or more processors are configured to execute the code to:
execute a first migration workflow for performing a first local transfer within the source virtualized computing system, the first local transfer being from a source host computer to a first mobility agent that operates as a simulated destination host computer;
execute a second migration workflow for performing a second local transfer within the destination virtualized computing system, the second local transfer being from a second mobility agent that operates as a simulated source host computer to the destination host computer; and
transfer, during execution of the first and second migration workflows, the virtualized computing instance between the first mobility agent and the second mobility agent over a network.

12. The computer system of claim 11, wherein the one or more processors are configured to execute the code to:
create a secure channel through the network between a first gateway in the source virtualized computing system and a second gateway in the destination virtualized computing system; and
send a configuration of the virtualized computing instance from the source virtualized computing system to the destination virtualized computing system over the secure channel.

13. The method of claim 12, wherein the one or more processors are configured to execute the code to:
remove data from the configuration prior to sending the configuration to the destination virtualized computing system.

14. The method of claim 11, wherein the one or more processors are configured to execute the code to:
create a shadow virtualized computing instance on the second mobility agent having a substantially same configuration as the virtualized computing instance.

15. A non-transitory computer readable medium comprising instructions, which when executed in a computer system, causes the computer system to carry out a method of migrating a virtualized computing instance between host computers in source and destination virtualized computing systems, comprising:
determining a set of hardware features for the virtualized computing instance running in a source host computer at the source virtualized computing system to generate migration compatibility data;
selecting a destination host computer at the destination virtualized computing system supporting the set of hardware features in the migration compatibility data; and
masking any of one or more hardware features of the destination host computer that is not present in the migration compatibility data from being visible to the virtualized computing instance, the set of hardware features including at least a CPU feature, a memory feature and a storage feature, wherein the masking is performed to prevent the virtualized computing instance running in the destination host computer at the destination virtualized computing system to adopt the masked hardware features so that the virtualized computing instance is compatible for migration back to the source host computer at the source virtualized computing system.

16. The non-transitory computer readable medium of claim 15, wherein the method further comprises:
  adding the migration compatibility data to a configuration of the virtualized computing instance; and
  sending the configuration of the virtualized computing instance from the source virtualized computing system to the destination virtualized computing system;
  wherein the destination host computer includes a set of hardware features matching the set of hardware features in the migration compatibility data.

17. The non-transitory computer readable medium of claim 15, wherein the method further comprises:
  executing a first migration workflow for performing a first local transfer within the source virtualized computing system, the first local transfer being from a source host computer to a first mobility agent that operates as a simulated destination host computer;
  executing a second migration workflow for performing a second local transfer within the destination virtualized computing system, the second local transfer being from a second mobility agent that operates as a simulated source host computer to the destination host computer; and
  transferring, during execution of the first and second migration workflows, the virtualized computing instance between the first mobility agent and the second mobility agent over a network.

18. The non-transitory computer readable medium of claim 17, wherein the method further comprises:
  creating a secure channel through the network between a first gateway in the source virtualized computing system and a second gateway in the destination virtualized computing system; and
  sending a configuration of the virtualized computing instance from the source virtualized computing system to the destination virtualized computing system over the secure channel.

19. The non-transitory computer readable medium of claim 18, wherein the method further comprises:
  removing data from the configuration prior to sending the configuration to the destination virtualized computing system.

* * * * *